Feb. 20, 1968   D. HUGHSON   3,369,428
LOCKING DIFFERENTIAL
Filed Oct. 22, 1965

DOUGLAS HUGHSON
INVENTOR

BY John R. Faulkner
Robert E. McCollum
ATTORNEYS

Patented Feb. 20, 1968

3,369,428
LOCKING DIFFERENTIAL
Douglas Hughson, Southfield, Mich., assignor to Ford Motor Company, Dearborn, Mich., a corporation of Delaware
Filed Oct. 22, 1965, Ser. No. 501,863
8 Claims. (Cl. 74—710.5)

ABSTRACT OF THE DISCLOSURE

A motor vehicle differential assembly having a normally disengaged clutch unit between the differential carrier and one side gear, the clutch consisting of a disc axially slidably splined to the carrier and interleaved with a pair of friction discs loosely mounted on the side gear and axially spaced from a pair of side gear reaction members; whereby, rotation of the carrier in either direction with respect to the side gear causes wedge-like members on the carrier disc to axially spread the loosely mounted side gear discs into frictional engagement with the reaction members to thereby lock the differential gearset to rotate as a unit, slippage, however, being permitted between the discs during a cornering action of the vehicle.

---

This invention relates to an axle subassembly for a motor vehicle. More particularly, it relates to a high traction locking-type differential for use in a driving axle assembly of a motor vehicle.

One of the primary objects of the invention is to provide a differential that improves the traction of a motor vehicle.

A further object of the invention is to provide an axle assembly with a locking-type differential including a clutch between a pair of members of the differential, the clutch normally being disengaged, and engaging only when one of the vehicle wheel driving axle shafts tends to rotate faster than the other.

A still further object of the invention is to provide a locking-type differential in which a mechanically engaged clutch is connected between the differential carrier and one side gear, the clutch having cooperating wedge and ramp-like surfaces that retard relative rotation between the carrier and side gears.

Another object of the invention is to provide a differential for a motor vehicle including a normally disengaged clutching unit between the differential carrier and one side gear, the clutch consisting of a disc axially slidably splined to the carrier and interleaved with a pair of friction discs loosely mounted on the side gear and axially spaced from a pair of side gear reaction members; whereby, rotation of the carrier in either direction with respect to the side gear causes wedge-like members on the carrier disc to axially spread the loosely mounted side gear discs into frictional engagement with the reaction members to thereby lock the differential gearset to rotate as a unit, slippage, however, being permitted between the discs during a cornering action of the vehicle.

Figure 1:
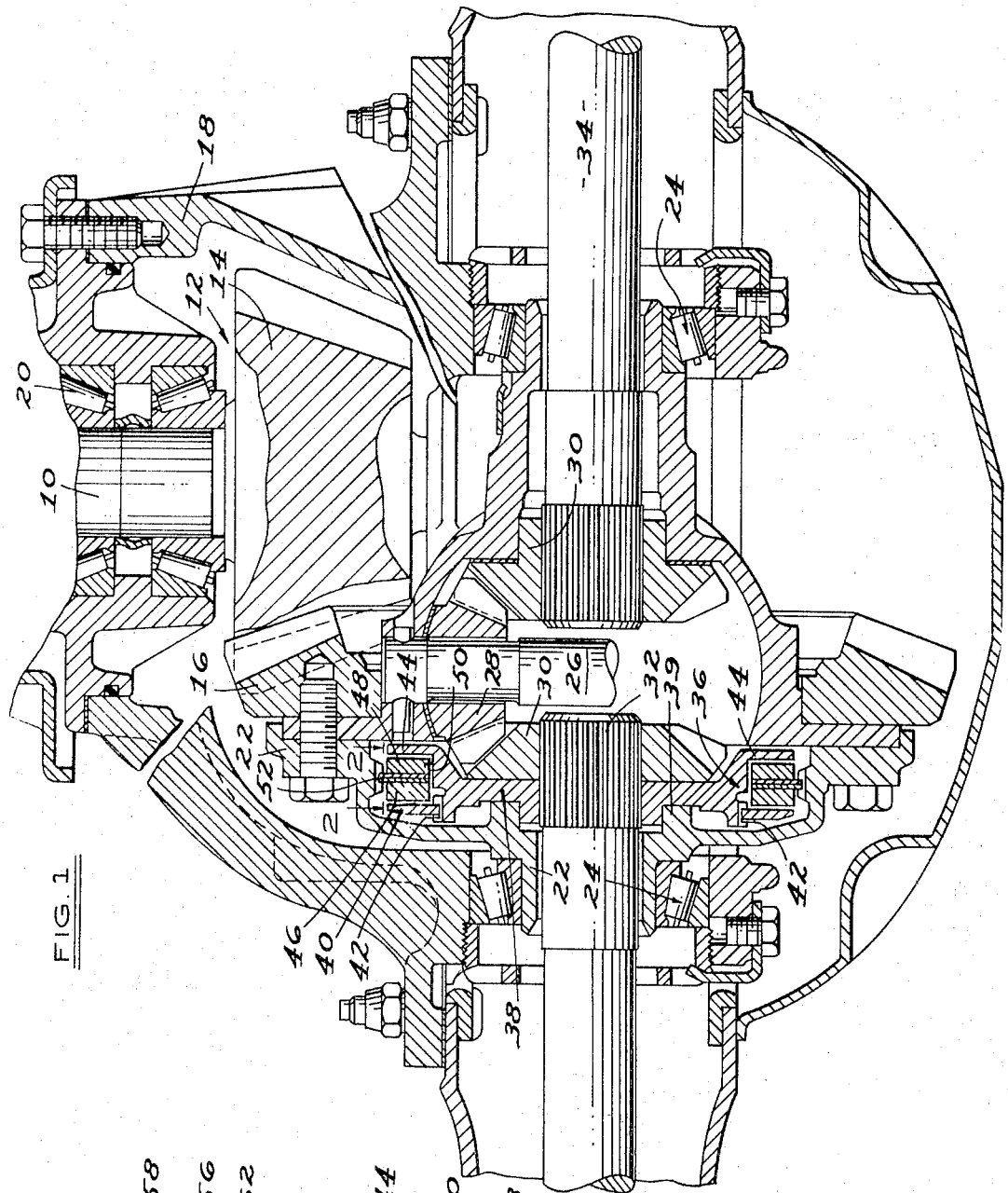
Figure 2:
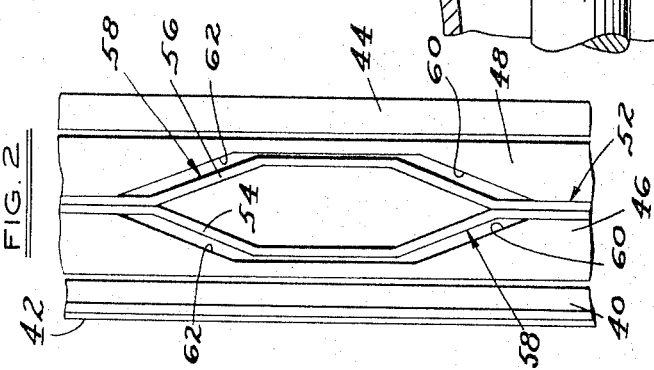

Other objects, features and advantages of the invention will become apparent upon reference to the succeeding, detailed description thereof, and to the drawings illustrating the preferred embodiment thereof; wherein, FIGURE 1 shows a cross-sectional plan view of a rear axle subassembly embodying the invention; and, FIGURE 2 is an enlarged cross-sectional view of a detail of FIGURE 1 taken on a plane indicated by and viewed in the direction of the arrows 2—2 of FIGURE 1.

FIGURE 1, which is essentially to scale, shows the driven axle assembly for a front or rear wheel driven motor vehicle less the wheels, hubs and brakes. The assembly includes a shaft 10 that constitutes the power input member for a conventional reduction drive gearset 12 consisting of a pinion bevel gear 14 meshed at right angles to a ring bevel gear 16. Shaft 10 would be connected by a conventional universal joint and propeller shaft (not shown) to the power output member of a transmission (also not shown). Shaft 10 is rotatably mounted in a suitable housing 18 on two rows of spaced needle bearings 20, and has pinion gear 14 formed integral therewith.

The differential gearset includes a hollow annular case or carrier 22 that is bolted to ring gear 16, and is rotatably supported upon housing 18 by two rows of roller taper bearings 24. A planet pinion shaft 26 extends through carrier 22, and is pinned to it, as shown. The shaft rotatably mounts a pair of planet pinion bevel gears 28 that mesh with a pair of spaced side bevel gears 30. The side gears are internally splined to separate wheel driving axle shafts 32 and 34 extending in opposite directions, as shown, through appropriate openings in the case 22.

As thus far described, the differential gearset described is conventional, and operates in a known manner. If the loads on axle shafts 32 and 34 are equal, the torque applied to pinion input shaft 10 will be distributed equally through planet gears 28 to side gears 30 and axle shafts 32 and 34. This causes all of the gears of the differential to rotate as a unit. If, however, the axle shaft loads are unequal, such as when one wheel is on dry pavement, and the other wheel is on ice, or in mud, the input torque normally is distributed to the wheel offering the least resistance to rotation, the other wheel thus remaining stationary. The vehicle then generally remains stationary. To prevent this, the invention provides a mechanical clutch unit 36 between carrier 22 and one of the side gears 30. The clutch normally is disengaged to permit a conventional operation of the differential gearing, and is engaged automatically only when relative rotation between the carrier and side gears occurs, indicating unequal loads on the axle shafts.

More specifically, axle shaft 32 has a radial disc-like exension 38 that is located axially between the left-hand side gear 30 and an extension 39 from case 22. Disc 38 is externally splined at one side to a reaction plate or disc member 40 located axially in one direction by a snap ring 42. Disc 38 has a further annular extension 44 at its right edge. A pair of axially spaced discs 46 and 48 are loosely mounted on the outer peripheral portion 50 of disc 38, and axially spaced from the reaction discs 40 and 44, and from each other, as best seen in FIGURE 2. A further disc-like member 52 is slidably splined to case 22, and extends loosely between discs 46 and 48.

The axially adjacent faces of plate 40 and disc 46, and plate 44 and disc 48, are provided with friction surfaces to retard relative rotation between the adjacent members when engaged in response to engagement of the clutch 36 in a manner to be described.

Referring to FIGURE 2, the member 52 consists of two thin discs 54 and 56 that are axially spread at two spaced circumferential points to form a pair of substantially V-shaped wedges or cams 58. The adjacent or inner edges of discs 46 and 48 are each provided with a pair of circumferentially spaced, substantially mating ramp surfaces 60 and 62 that are axially aligned with the adjacent surfaces of wedges 58. Thus, the axially adjacent ramp surfaces of discs 46 and 48 face each other and converge so as to be substantially parallel to the surfaces of wedges 58.

From an inspection of FIGURE 2, it will be clear that when the loads on the two axle shafts are equal, the differential gearing will rotate as a unit. The wedge and ramp surfaces 58, 60 and 62 will be in the disengaged positions shown, or, if engaged, at the most abutting each other with no axial forces exerted on the discs 46 and 48 by member 52. However, upon relative rotation in either direction between the wedges 58 and the friction discs 46 and 48, the wedges 58 will enter the converging area between discs 46 and 48 and thus axially spread or move the discs into frictional engagement with the side gear reaction members 40 and 44. The carrier 22 will thus be frictionally locked to side gear 30. The entire differential gearset will then rotate as a unit. Thus, a rotation of one axle relative to the other will be substantially prevented by engagement of the clutch mechanism.

The inclination of the wedge means and ramp surfaces would be chosen such as to provide sufficient axial force to prevent relative rotation between carrier 22 and side gears 30 when the vehicle is moving straight ahead and the load on one of the shafts is low; such as, for example, when one wheel is mired in mud or is on ice and the other wheel is on dry pavement. The axial force, however, will not be sufficient to prevent the desired cornering action of the vehicle. That is, doing cornering, the inside wheel slows down, which tends to speed up the opposite side gear 30 with respect to the carrier 22. This would normally engage the clutch 36 to lock up the differential and, therefore, hinder the turning of the vehicle. However, by a proper choice of angles for the wedge and ramp surfaces, the maximum axial force that the clutch can exert at this time will be less than the force tending to rotate the side gear faster, and, accordingly, slippage will occur between the reaction members 40 and 44 and the discs 46 and 48. Therefore, slippage is prevented at all times except when the vehicle is cornering.

From the foregoing, therefore, it will be seen that the invention provides a differential gearset that operates in a conventional manner upon equal application of torque to the driving axle shafts, and automatically effects an engagement of the differential carrier with the side gear when one tends to rotate faster than the other during a straight ahead drive of the vehicle. It will also be seen that the locking differential described permits a cornering action by permitting slippage between the clutching elements at this time.

While the invention has been illustrated in its preferred embodiment in the figures, it will be clear to those skilled in the arts to which the invention pertains that many changes and modifications may be made thereto without departing from the scope of the invention.

What is claimed is:

1. A locking differential including a differential carrier member, a side gear member, and a normally disengaged coupling mechanism between said carrier and side gear members, said mechanism including a first axially movable friction disc loosely mounted on one of said members for relative rotation with respect thereto, a second disc secured to the other of said members and axially aligned with said first disc and normally axially spaced therefrom, reaction friction means on said one member in the path of axial movement of said first disc preventing axial movement thereof beyond a predetermined amount, and wedge means extending axially from one of said discs and normally spaced from the other of said discs, said wedge means being engageable with the other of said discs upon rotation of said carrier in one direction relative to said side gear to wedge said first and second discs together against said reaction means for substantially unitary rotation of said carrier and side gear.

2. A locking differential including a differential carrier, a side gear, and a normally disengaged coupling mechanism between said carrier and side gear, said mechanism including a first axially movable friction disc loosely mounted on said side gear for relative rotation with respect thereto, a second disc secured to said carrier and axially aligned with said first disc and normally axially spaced therefrom, reaction friction means on said side gear in the path of axial movement of said first disc preventing axial movement thereof beyond a predetermined amount, and wedge means extending axially from one of said discs and normally spaced from the other of said discs, said wedge means being engageable with the other of said discs upon rotation of said carrier in one direction relative to said side gear to wedge said first and second discs together against said reaction means for substantially unitary rotation of said carrier and side gear.

3. A locking differential including a differential carrier, a side gear, and a normally disengaged coupling mechanism between said carrier and side gear, said mechanism including a first axially movable friction disc loosely mounted on said side gear for relative rotation with respect thereto, a second disc secured to said carrier and being axially aligned with and normally axially spaced from said first disc, reaction friction means on said side gear in the path of axial movement of said first disc preventing axial movement thereof beyond a predetermined amount, and wedge means extending axially from one of said discs and normally spaced from the other of said discs, said wedge means being engageable with the other of said discs upon rotation of said carrier relative to said side gear to wedge said first and second discs together against said reaction means for substantially unitary rotation of said carrier and side gear.

4. A locking differential including a differential carrier, a side gear, and a normally disengaged coupling mechanism between said carrier and side gear, said mechanism including a first axially movable friction disc loosely mounted on said side gear for relative rotation with respect thereto, a second disc secured to said carrier and cooperating with said first disc and normally axially spaced therefrom, reaction friction means on said side gear in the path of axial movement of said first disc preventing axial movement thereof beyond a predetermined amount, and wedge means extending axially from one of said discs and normally spaced from the other of said discs, said wedge means being engageable with the other of said discs upon rotation of said carrier in either direction relative to said side gear to wedge said first and second discs together against said reaction means for substantially unitary rotation of said carrier and side gear.

5. A locking differential assembly including a differential carrier, a side gear, and a normally disengaged coupling mechanism between said carrier and side gear, said mechanism including a pair of axially spaced and movable friction discs loosely mounted on said side gear for relative rotation with respect thereto, a disc secured to said carrier and interleaved with said pair of discs and normally axially spaced therefrom, reaction friction disc means on said side gear in the path of axial movement of said pair of discs preventing axial movement thereof beyond a predetermined amount, and normally disengaged cooperating cam and ramp means extending axially from adjacent portions of said carrier disc and pair of discs and engageable upon rotation of said carrier relative to said side gear and wedging all of said discs together against said reaction means for a substantially unitary movement of said carrier and side gear.

6. A locking differential including a differential carrier, a planet gear rotatably fixed to said carrier and meshing with a pair of spaced side gears, and a normally disengaged coupling mechanism between said carrier and one of said side gears, said mechanism including a pair of axially spaced outer reaction friction disc plates secured to said one side gear, a pair of axially spaced and movable inner friction discs loosely mounted on said one side gear between said outer plates for relative rotation with respect thereto, a disc secured to said carrier and extending between said inner pair of discs and normally axially spaced therefrom, said carrier disc having wedge surfaces thereon extending axially therefrom, said inner discs each having an axially angled ramp surface adjacent one of said wedge surfaces, said ramp surfaces together converging axially, said wedge and ramp surfaces normally being circumferentially separated upon equal division of torque to said side gears, said wedge and ramp surfaces being engageable upon rotation of said carrier relative to said one side gear to axially move said pair of inner discs and wedge all of said discs together against said outer reaction plates.

7. A locking differential including a differential carrier, a planet gear rotatably fixed to said carrier and meshing with a pair of spaced side gears, and a normally disengaged coupling mechanism between said carrier and one of said side gears, said mechanism including a pair of axially spaced outer reaction friction plates secured to said one side gear, a pair of axially spaced and movable inner friction discs loosely mounted on said one side gear between said outer plates for relative rotation with respect thereto, a disc secured to said carrier and extending between said inner pair of discs and normally axially spaced therefrom, said carrier disc having a wedge surface thereon extending axially therefrom, said inner discs each having an axially angled ramp surface adjacent a wedge surface, said ramp surfaces together converging axially, said wedge and ramp surfaces normally being circumferentially separated upon equal division of torque to said side gears, said wedge and ramp surfaces being engageable upon rotation of said carrier in one direction relative to said one side gear to axially move said pair of inner discs and wedge all of said discs together against said outer reaction plates.

8. A locking differential including a differential carrier, a planet gear rotatably fixed to said carrier and meshing with a pair of spaced side gears, and a normally disengaged coupling mechanism between said carrier and one of said side gears, said mechanism including a pair of axially spaced outer reaction friction plates secured to said one side gear, a pair of axially spaced and movable inner friction discs loosely mounted on said one side gear between said outer plates for relative rotation with respect thereto, a disc secured to said carrier and extending between said inner pair of discs and normally axially spaced therefrom, said carrier disc having a wedge surface thereon extending axially from opposite sides thereof at circumferentially spaced locations, said inner discs each having circumferentially spaced axially angled ramp surfaces adjacent said wedge surfaces, the ramp surfaces on one of said inner discs being axially aligned with the ramp surface on the other inner disc and together converging axially, said wedge and ramp surfaces normally being circumferentially separated upon equal division of torque to said side gears, said wedge and ramp surfaces being engageable upon rotation of said carrier in either direction relative to said one side gear to axially move said pair of inner discs and wedge all of said discs together against said outer reaction plates.

References Cited

UNITED STATES PATENTS

| 1,750,981 | 3/1930 | Wildhaber | 74—711 |
| 2,045,086 | 6/1936 | Kastner | 192—93 |
| 2,446,138 | 7/1948 | Lambert | 192—93 |
| 2,807,172 | 9/1952 | Jacobs | 192—35 |
| 3,212,359 | 10/1965 | Salzmann | 74—711 |
| 3,211,022 | 10/1965 | Anderson | 74—711 |

FOREIGN PATENTS 252,934    1/1948    Switzerland.

DONLEY J. STOCKING, *Primary Examiner.*

J. R. BENEFIEL, *Assistant Examiner.*